(12) United States Patent
Needham et al.

(10) Patent No.: US 7,439,901 B2
(45) Date of Patent: Oct. 21, 2008

(54) ACTIVE PHASED ARRAY ANTENNA FOR AIRCRAFT SURVEILLANCE SYSTEMS

(75) Inventors: Edward W. Needham, Wellsville, KS (US); David T. Mindrup, Olathe, KS (US); John C. Blessing, Spring Hill, KS (US)

(73) Assignee: Garmin International, Inc., Olathe, KS (US)

( * ) Notice: Subject to any disclaimer, the term of this patent is extended or adjusted under 35 U.S.C. 154(b) by 73 days.

(21) Appl. No.: 11/463,259

(22) Filed: Aug. 8, 2006

(65) Prior Publication Data

US 2008/0122693 A1    May 29, 2008

(51) Int. Cl.
*G01S 13/74* (2006.01)
*G01S 7/40* (2006.01)

(52) U.S. Cl. ............... 342/30; 342/29; 342/175; 342/198; 342/174; 342/368

(58) Field of Classification Search ......... 342/368–377, 342/198, 30, 175
See application file for complete search history.

(56) References Cited

U.S. PATENT DOCUMENTS

| | | | |
|---|---|---|---|
| 2,489,304 A | 11/1949 | Marchand et al. | |
| 3,212,089 A | 10/1965 | Longacre et al. | |
| 3,500,303 A | 3/1970 | Johnson | |
| 3,697,876 A | 10/1972 | Robbins et al. | |
| 3,787,863 A | 1/1974 | Watanabe et al. | |
| 3,789,408 A | 1/1974 | Ichihara et al. | |
| 3,824,595 A | 7/1974 | Hall | |
| 3,878,381 A | 4/1975 | Broder et al. | |
| 3,887,923 A | 6/1975 | Hendrix | |
| 3,890,617 A | 6/1975 | Moulton | |
| 3,927,406 A | 12/1975 | Bruder | |
| 3,935,575 A | 1/1976 | Leisterer et al. | |
| 3,973,262 A | 8/1976 | Böhm | |
| 4,000,466 A | 12/1976 | Scouten et al. | |
| 4,090,199 A | 5/1978 | Archer | |

(Continued)

OTHER PUBLICATIONS

The 100W class A power amplifier for L-band T/R module Wojtasiak, W.; Gryglewski, D.; Sedek, E.; Microwaves, Radar and Wireless Communications. 2000. MIKON-2000. 13th International Conference on vol. 2, May 22-24, 2000 pp. 675-677 vol. 2.*

(Continued)

*Primary Examiner*—Thomas H. Tarcza
*Assistant Examiner*—Cassi Galt
(74) *Attorney, Agent, or Firm*—Samuel M. Korte

(57) ABSTRACT

An active antenna is provided that includes an antenna element for transmitting RF transmit signals at a predetermined effective radiated power (ERP). An antenna module is configured to be mounted to an aircraft, with the antenna element being mounted to the antenna module. A connector module is provided at the antenna module and is configured to be coupled to a communications link and receive electrical transmit signals from the communications link. A transmit path is provided within the antenna module and extends between the antenna element and the connector module. A power amplifier is provided on the antenna module along the transmit path. The power amplifier increases a power level of the electrical transmit signals, received from the communications link, by a predetermined amount sufficient to drive the antenna element to transmit the RF transmit signals at the predetermined ERP.

18 Claims, 4 Drawing Sheets

U.S. PATENT DOCUMENTS

| Patent No. | | Date | Inventor | Ref |
|---|---|---|---|---|
| 4,123,759 | A | 10/1978 | Hines et al. | |
| 4,203,114 | A | 5/1980 | Gerst et al. | |
| 4,209,791 | A | 6/1980 | Gerst et al. | |
| 4,333,170 | A | 6/1982 | Mathews et al. | |
| 4,366,483 | A | 12/1982 | Hagedon et al. | |
| 4,488,155 | A | 12/1984 | Wu | |
| 4,591,862 | A | 5/1986 | Parkhurst et al. | |
| 4,626,859 | A | 12/1986 | Stansfield | |
| 4,638,320 | A | 1/1987 | Eggert et al. | |
| 4,638,321 | A | 1/1987 | Drogin | |
| 4,639,733 | A | 1/1987 | King et al. | |
| 4,689,623 | A | 8/1987 | Schwab et al. | |
| 4,719,465 | A | 1/1988 | Kuroda | |
| 4,796,031 | A | 1/1989 | Koki | |
| 4,809,012 | A | 2/1989 | Tong | |
| 4,855,748 | A | 8/1989 | Brandao et al. | |
| 4,888,593 | A | 12/1989 | Friedman et al. | |
| 4,899,157 | A | 2/1990 | Sanford et al. | |
| 4,924,232 | A | 5/1990 | Hudson et al. | |
| 4,926,184 | A | 5/1990 | Galati et al. | |
| 4,947,176 | A | 8/1990 | Inatsune et al. | |
| 4,975,710 | A | 12/1990 | Baghdady | |
| 4,996,532 | A | 2/1991 | Kirimoto et al. | |
| 5,003,314 | A | 3/1991 | Berkowitz et al. | |
| 5,008,844 | A | 4/1991 | Kyriakos et al. | |
| 5,072,224 | A | 12/1991 | Vebeke et al. | |
| 5,122,808 | A | 6/1992 | Kyriakos | |
| 5,191,349 | A | 3/1993 | Dinsmore et al. | |
| 5,253,188 | A * | 10/1993 | Lee et al. | 702/183 |
| 5,276,452 | A * | 1/1994 | Schuss et al. | 342/371 |
| 5,341,145 | A | 8/1994 | Eckersten et al. | |
| 5,469,172 | A | 11/1995 | Schleder et al. | |
| 5,541,607 | A | 7/1996 | Reinhardt | |
| 5,541,608 | A | 7/1996 | Murphy et al. | |
| 5,552,788 | A | 9/1996 | Ryan et al. | |
| 5,568,154 | A | 10/1996 | Cohen | |
| 5,589,838 | A | 12/1996 | McEwan | |
| 5,598,437 | A | 1/1997 | Gourse | |
| 5,604,504 | A | 2/1997 | Nail | |
| 5,619,206 | A | 4/1997 | Cole, Jr. et al. | |
| 5,657,027 | A | 8/1997 | Guymon, II | |
| 5,724,047 | A | 3/1998 | Lioio et al. | |
| 5,764,187 | A | 6/1998 | Rudish et al. | |
| 5,815,117 | A | 9/1998 | Kolanek | |
| 5,867,535 | A | 2/1999 | Phillips et al. | |
| 5,889,491 | A | 3/1999 | Minter | |
| 5,943,010 | A | 8/1999 | Rudish et al. | |
| 6,018,644 | A | 1/2000 | Minarik | |
| 6,054,948 | A | 4/2000 | Dean | |
| 6,064,338 | A | 5/2000 | Kobayakawa et al. | |
| 6,085,151 | A | 7/2000 | Farmer et al. | |
| 6,127,966 | A * | 10/2000 | Erhage | 342/174 |
| 6,169,519 | B1 | 1/2001 | Holecek et al. | |
| 6,204,812 | B1 | 3/2001 | Fattouche | |
| 6,285,313 | B1 | 9/2001 | Wahab et al. | |
| 6,392,598 | B1 | 5/2002 | Jones et al. | |
| 6,433,738 | B1 | 8/2002 | Kikuchi | |
| 6,441,783 | B1 | 8/2002 | Dean | |
| 6,486,839 | B1 | 11/2002 | Minter | |
| 6,529,820 | B2 | 3/2003 | Tomescu | |
| 6,587,069 | B2 | 7/2003 | Ringwald et al. | |
| 6,587,863 | B1 | 7/2003 | Gentile et al. | |
| 6,606,055 | B2 * | 8/2003 | Halsema et al. | 342/368 |
| 6,611,231 | B2 | 8/2003 | Crilly, Jr. et al. | |
| 6,727,842 | B1 | 4/2004 | Schleder et al. | |
| 6,778,138 | B2 | 8/2004 | Purdy et al. | |
| 6,792,033 | B1 | 9/2004 | Maruta et al. | |
| 6,795,018 | B2 | 9/2004 | Guo | |
| 6,876,323 | B2 * | 4/2005 | Feldle et al. | 342/175 |
| 6,999,022 | B1 | 2/2006 | Vesel et al. | |
| 2003/0206134 | A1 * | 11/2003 | Lier et al. | 342/368 |
| 2006/0071845 | A1 * | 4/2006 | Stroili et al. | 342/13 |

OTHER PUBLICATIONS

Federal Aviation Administration TCAS Home Page http://adsb.tc.faa.gov/TCAS.htm.* http://embeddeddsp.embedded.com/showArticle.jhtml;jsessionid=XBDNFUFIRPSRWQSNDLPCKHSCJUNN2JVN?articleID=60401726; 10 pages; printed Aug. 7, 2006.

Interferometer Design for Evaluation Angle Estimation, IEEE Transactions on Aerospace and Electronic Systems, vol. AEX-13, No. 5, pp. 486-503 (Sep. 1977).

RJ Zavrel, RF Design, Mar. 1988, pp. 27-31.

* cited by examiner

ACTIVE PHASED ARRAY ANTENNA FOR AIRCRAFT SURVEILLANCE SYSTEMS

BACKGROUND OF THE INVENTION

The present invention generally relates to an active antenna system for use in an aircraft, and more particularly to an active phased array antenna system for use in an aircraft surveillance system.

Today, systems exist for use in aircraft surveillance for collision avoidance and traffic alert. These conventional systems use active interrogation of Mode Select (Mode-S) and Air-Traffic Control Radar Beacon System (ATCRBS) transponders that can incorporate a passive phased array antenna. Conventional Mode-S and ATCRBS transponders transmit encoded messages containing information about the aircraft in response to interrogation signals received from ground based radar or from an aircraft with a Traffic Advisory System (TAS), or Traffic Collision Avoidance System (TCAS). When the transponder is not transmitting, it monitors for transmissions including interrogation signals.

The Minimum Operating Performance Specifications (MOPS) for the TCAS II system is described in RTCA document DO-185A, "Minimum Operational Performance Standards for Air Traffic Alert and Collision Avoidance System II (TCAS II) Airborne Equipment", dated December 1997 and the MOPS for TCAS I and TAS are embodied in RTCA document DO197A, "Minimum Operational Performance Standards for Active Traffic Alert and Collision Avoidance System I (Active TCAS I)" both of which are incorporated herein by reference.

TAS, TCAS I and TCAS II equipment transmit interrogation signals that are received and replied to by other aircraft and used to determine the location of other aircraft relative to the originating aircraft position. Conventional TAS, TCAS I and TCAS II systems may include a 4-element interferometer antenna coupled, to a remote radio frequency (RF) transmitter/receiver. The transmitter and receiver are coupled to the antenna array by multiple low loss coaxial transmission lines. The coaxial transmission lines may be several feet in length (e.g. 30 feet long). The antenna arrays utilized by conventional TCAS systems are "passive" in that all of the power utilized to drive the antenna array elements is produced at the remote transmitter assembly. Similarly, all of the power that is used to boost the receive range of the antenna array is provided at the remote receiver assembly.

The transmitter and receiver are in turn coupled to a signal processor that controls transmission and reception of TAS and TCAS related information and that performs aircraft surveillance operations, such as traffic alert and collision avoidance operations. The transmitter is coupled to the signal processor for transmitting, among other things, interrogation signals. A control panel and display are joined to the signal processor for operating the TAS/TCAS system and for displaying TAS/TCAS information.

The TCAS system identifies the location and tracks the progress of aircraft equipped with beacon transponders. Currently, there are three versions of the surveillance systems in use; TAS, TCAS I, and TCAS II. TAS is the simplest and least expensive of the alternatives, TCAS I, is less expensive but also less capable than TCAS II. The TAS and TCAS I transmitter send signals and interrogate ATCRBS transponders. The TAS and TCAS I receivers and displays indicate approximate bearing and relative altitude of all aircraft within the selected range (e.g., about forty miles). Further, the TAS and TCAS systems use color coded dots to indicate which aircraft in the area pose a potential threat (e.g., potential intruder aircraft). The dots are referred to as a Traffic Advisory (TA). When a pilot receives a TA, the pilot then visually identifies the intruder aircraft and is allowed to deviate up to +300 feet vertically. Lateral deviation is generally not authorized. In instrument conditions, the pilot notifies air traffic control for assistance in resolving conflicts.

The TCAS II system offers all of the benefits of the TCAS I system, but also issues a Resolution Advisory (RA) to the pilot. In the RA, the intruder target is plotted and the TCAS II system determines whether the intruder aircraft is climbing, diving, or in straight and level flight. Once this is determined, the TCAS II system advises the pilot to execute an evasive maneuver that will resolve the conflict with the intruder aircraft. Preventive RAs instruct the pilot not to change altitude or heading to avoid a potential conflict. Positive RAs instruct the pilot to climb or descend at a predetermined rate of 2500 feet per minute to avoid a conflict. TCAS II is capable of interrogating Mode-C and Mode-S. In the case of both aircraft having Mode-S interrogation capability, the TCAS II systems communicate with one another and issue de-conflicted RAs.

Each of the above-described surveillance systems may utilize a passive phased antenna array that is coupled, via coaxial transmission lines, with a remote transceiver that controls transmit and receive operations. The individual antenna elements of the phased antenna array are coupled to separate transmission lines. Conventional phased antenna arrays are "passive" such that, during a transmit operation, the remote transceiver supplies transmit signals over the corresponding transmission lines at high power levels. The high power is provided from a high power source that is located at the transceiver, remote from the passive antenna array. The remote power source amplifies the transmit signals supplied to the transmission lines with sufficient power to drive the remote antenna elements with an input power of about 200 Watts (W), such as to provide a transmit range of 45 nautical miles given typical directional antenna gain.

During a receive operation, signals that are received by the antenna elements are conveyed at very low power levels without any power boosting from the passive antenna array over the transmission paths to the transceiver. Receiver systems incorporating passive antenna arrays have an inherent receive range that is dependent, among other things, upon the characteristics of the passive components provided along the receive path, noise, loss, sensitivity and the like. The receive characteristics of the components improve with cost. The sensitivity of the receive path directly impacts the receive range. Therefore, as sensitivity decreases, range similarly decreases. In certain applications, it is desirable to provide a receive range of 100 nautical miles which may not be possible with these conventional passive systems.

Passive antenna arrays have experienced limitations in the overall receiver system performance, system range and transmit power efficiency. The transmit path (e.g. transmission lines and passive components at the antenna array) forms a lossy path that attenuates the high power transmit signals during propagation from the transceiver to the passive antenna array. The power efficiency of the transmitter is limited due, in part, to transmission losses suffered while conveying high power over the coaxial transmission lines. The transmit power losses impact the system transmit range.

To maintain a desired performance, the output power of the transmitter must be relatively high to compensate for system losses. The losses may result from coaxial cable loss between the transmitter and the antenna array. Losses may occur due to internal effects in the transceiver such as high power beam-steering or high power attenuation circuits inherent in previous TAS/TCAS designs that respectively do beam forming of directional antennas, and transmit power attenuation in a process known as Whisper-Shout. Losses resulting from the coaxial cables and these other sources drive the need for high power amplifiers at the transmitter. For example, a conventional transceiver may need to generate as much as 1000 W (250 W per channel) of power at the output of the transmitter in the transceiver, while the input to the antenna array is only 200 W (50 W per channel) due to losses experienced in the transceiver and along the transmission path. An antenna with an input power of 200 W (effective radiated power or ERP is defined as the product of the transmit power times the antenna gain, typically 3 dB or twice the incident power for a directional antenna, 400W in this example) may only have an effective broadcast range of up to 45 Nautical miles.

The system also experiences limitations in the receive range and receive sensitivity due to the losses and noise produced by the coaxial transmission line and associated circuit components at the receiver and transmitter that maintain desired performance characteristics of the remotely located passive antenna array. For example, a conventional system may only be able to provide receive sensitivity for up to 90 Nautical miles. The limited receive sensitivity is due in part to cable losses, in part to noise within the receive signal path and the like.

A need exists for an improved antenna system that does not experience excessive degradation of the receive system performance, system range or transmit power losses.

BRIEF DESCRIPTION OF THE INVENTION

In accordance with one embodiment, an active antenna is provided that includes an antenna element for transmitting RF transmit signals at a predetermined effective radiated power (ERP). An antenna module is configured to be mounted to an aircraft, with the antenna element being mounted to the antenna module. The connector module is provided at the antenna module and is configured to be coupled to a communications link and receive electrical transmit signals from the communications link. The transmit path is provided within the antenna module and extends between the antenna element and the connector module. A power amplifier is provided on the antenna module along the transmit path. The power amplifier increases a power level of the electrical transmit signals, received from the communications link, by a predetermined amount sufficient to drive the antenna element to transmit the RF transmit signals at the predetermined ERP.

Optionally, the antenna may include a plurality of antenna elements that transmit RF signals as a phased array. The connector module receives, from the communications link, the transmit signals at a power level that is less than the predetermined ERP at which the RF transmit signals are transmitted from the antenna element. Optionally, the connector module may represent a coaxial connector module that conveys the transmit signals at low power from the communications link.

In accordance with an alternative embodiment, an active antenna is provided that includes an antenna element for receiving RF received signals at a receive power level and outputting electrical receive signals based on the RF received signals. An antenna module is configured to be mounted to an aircraft, where the antenna element is mounted to the antenna module. The connector module is provided at the antenna module and is configured to be coupled to a communications link and output the electrical receive signals to the communications link. The receive path is provided within the antenna module and extends between the antenna element and the connector module. An amplifier element is provided on the antenna module along the receive path. The amplifier element increases a power level of the electrical receive signal, received at the antenna element, above the previous element power level before outputting the electrical receive signal from the connector module onto the communications link.

Optionally, a phased array may be provided that includes a plurality of antenna elements that receive RF signals. Optionally, the antenna module may include a phased array having a plurality of antenna elements, where the connector module includes an equal plurality of coaxial connectors that are configured to be coupled to corresponding coaxial cables that form the communications link.

DETAILED DESCRIPTION OF THE INVENTION

Embodiments of the present invention are described in connection with an automatic calibration system for a Traffic Avoidance System (TAS), or Traffic Collision Avoidance System (TCAS I and TCAS II). However, it is understood that the present invention may be utilized in other aircraft surveillance applications. In one implementation, the automatic calibration system operates with a four element active phased array antenna that includes four transmitter and receiver channels.

Figure 1:
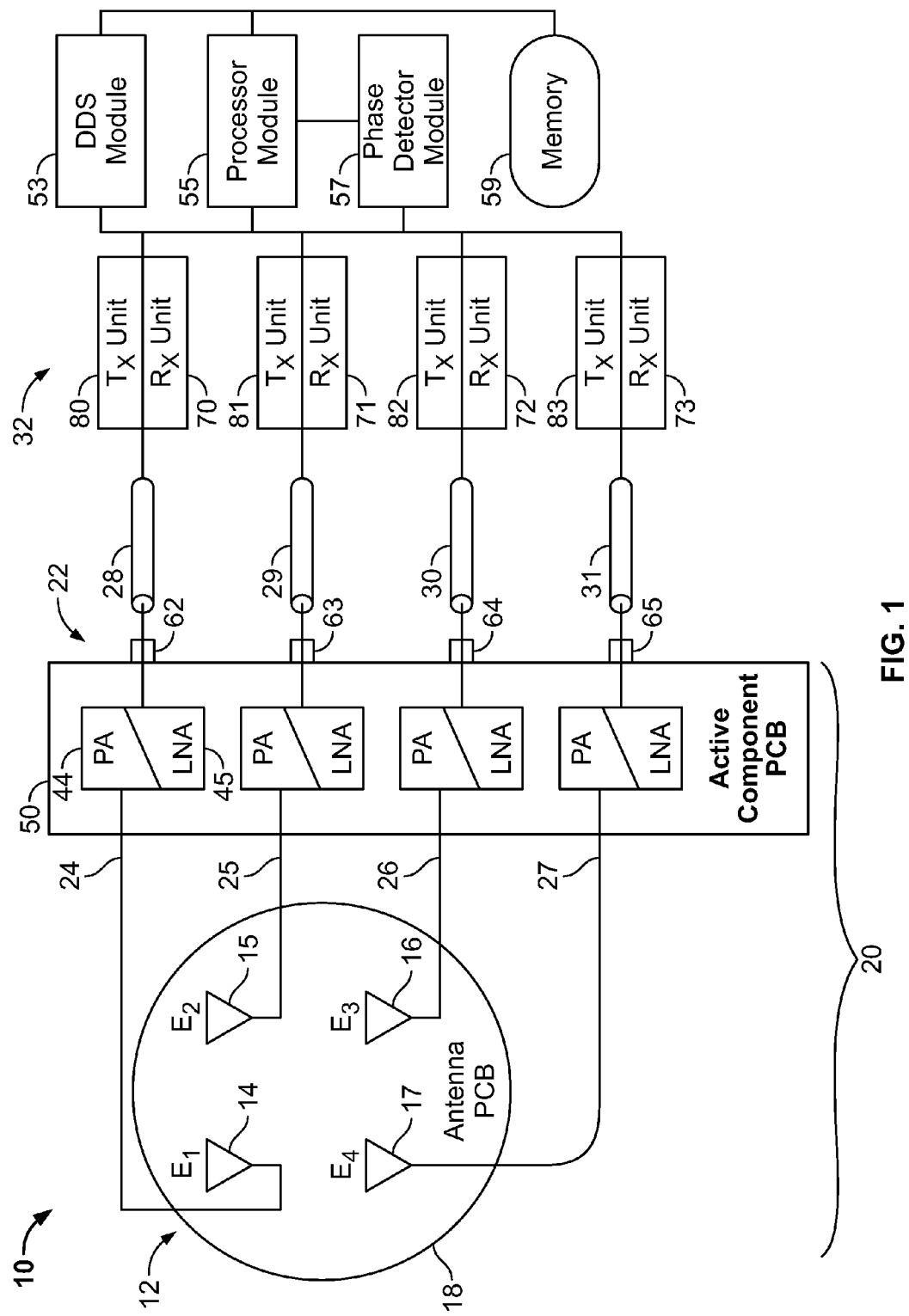
FIG. 1 illustrates a block diagram of a surveillance system implementing an active antenna in accordance with an embodiment of the present invention.

FIG. 1 illustrates a block diagram of an active phased array antenna system 10 that is formed in accordance with an embodiment of the present invention. The system 10 includes an antenna array 12 that comprises a plurality of antenna elements 14-17, each of which is mounted to a common antenna printed circuit board (PCB) 18. The antenna array 12 forms part of an antenna module 20 that is configured to be mounted to an aircraft. The antenna elements 14-17 transmit and receive RF transmit and receive signals, for example at 1030 MHz and 1090 MHz, respectively. The antenna elements 14-17 collectively transmit RF transmit signals at a predetermined effective radiated power (ERP). Antenna gain can be typically 3 dB or twice the incident power for an active phased directional array, such that the ERP may be 400 Watts (W) with only 200 W being cumulatively delivered to the four antenna elements. Each antenna element 14-17 communicates over a separate physical channel 24-27 (also referred to as channels E1 to E4) within the antenna module 20.

The antenna module 20 may include first and second circuit boards configured to be mounted to the exterior and interior, respectively, of an aircraft. For example, the antenna module 20 preferably includes an active component PCB 50 that is interposed between the antenna PCB 18 and transmission lines 28-31. The active component PCB 50 includes power amplifiers 44 and low noise amplifiers 56 in each of channels 24-27. The power amplifiers 44 are utilized during transmission operations. The power amplifiers 44 are provided on the antenna module 20 along each transmit path and operate to increase a power level of the electrical transmit signals, received from the transmission lines 28-31, by a predetermined amount sufficient to drive the corresponding antenna element 14-17 at the predetermined ERP. The connector module 22 receives, from the transmission line 28-31 (that collectively define the communications link), the transmit signals at a power level of between 1 W and 10 W, and more preferably between 4 W and 8 W. The transmit signals are amplified by the power amplifiers 44, such that each of the antenna elements 14-17 are driven by RF signals at a power level substantially higher than 10 W, such as between 40 W and 80 W or more preferably at about 50 W.

The low noise amplifiers 45 are provided along receive paths on the active component PCB 50. The low noise amplifiers 45 increase a power level of the electrical receive signals, received by the antenna elements 14-17, to a predetermined receive power level before outputting the electrical receive signals onto the transmission lines 28-31.

The antenna module 20 includes a connector module (generally denoted 22) that includes separate coaxial connector elements 62-65 that are associated with each of the channels 24-27. The connector module 22 is configured to couple transmission lines 28-31 with associated corresponding channels 24-27, respectively. Each transmission line 28-31 transmits and receives electrical transmit and receive signals, respectively, to and from a remote transmit/receive (T/R) unit 32. For example, the transmit/receive unit 32 transmits interrogation signals to the antenna array 12 and receives reply information from the antenna array 12. The connector module 22 receives the transmit signals at a power level that is less than the predetermined ERP at which the RF transmit signals are transmitted from the antenna elements 14-17.

The T/R unit 32 includes transmitter units 80-83 and receiver units 70-73 that are joined to corresponding transmission lines 28-31. The transmission lines 28-31 may be coaxial lines that convey transmit and receive signals in a multiplexed manner between the antenna module 20 and the T/R unit 32. The coaxial lines convey the transmit and receive signals at low power (e.g. less than 10 W). The transmitter and receiver units 80-83 and 70-73 are joined to a direct digital synthesis (DDS) module 53, a processor module 55 and a phase detector module 57. The processor module 55 and DDS module 53 communicate with the phase detector module 57 and access memory 59 to store and retrieve information. The DDS module 53 performs beam forming in connection with transmit operations. The DDS module 53 provides transmit signals to the transmitter units 80-83 that output low power transmit signals over the transmission lines 28-31. The transmit signals are output by the transmitter units 80-83 at low power, such as between 1 and 10 watts, or more preferably between 4 and 8 watts. The transmit signals are output at a power output level substantially below the ERP produced by the antenna array 12 and even the power provided to the antenna array 12. For example, the transmit units 80-83 may generate transmit signals at a power of 6 W, which is received by the antenna module 20 over the transmission lines 28-31. The transmit signals are amplified, at the antenna module 20, to about 200 W before being provided to the antenna array 12, such that the ERP produced at the antenna array 12 is about 400 watts.

The phase detector module 57 receives, from the receiver units 70-73, receive signals that are received at the antenna elements 14-17. The phase detector module 57 determines, among other things, phase differences between the receive channels. The processor module 55 may utilize the phase differences to derive phase calibration offsets that are associated with each channel 24-27. The phase calibration offsets correct for insertion phase introduced by the transmission lines 28-31, components within the T/R unit 32, components upon the active component PCB 50 and the like. In addition, the processor module 55 may ultimately utilize these receive signals processed by the phase detector module 57 to provide bearing information on intruder aircraft corrected by the aforementioned calibration offsets.

The processor module 55 receives from the receiver units 70-73, receive signals that are received at the antenna elements 14-17. The processor module 55 determines, among other things, rise times of pulse amplitude modulated reply waveforms and squitter transmissions emanating from both solicited or unsolicited transponder transmissions, fall times of said signals, and amplitude levels of said signals on each of the receive channels E1-E4 (24-27). The processor module 55 may utilize this information among other things to identify and track aircraft.

Figure 2:
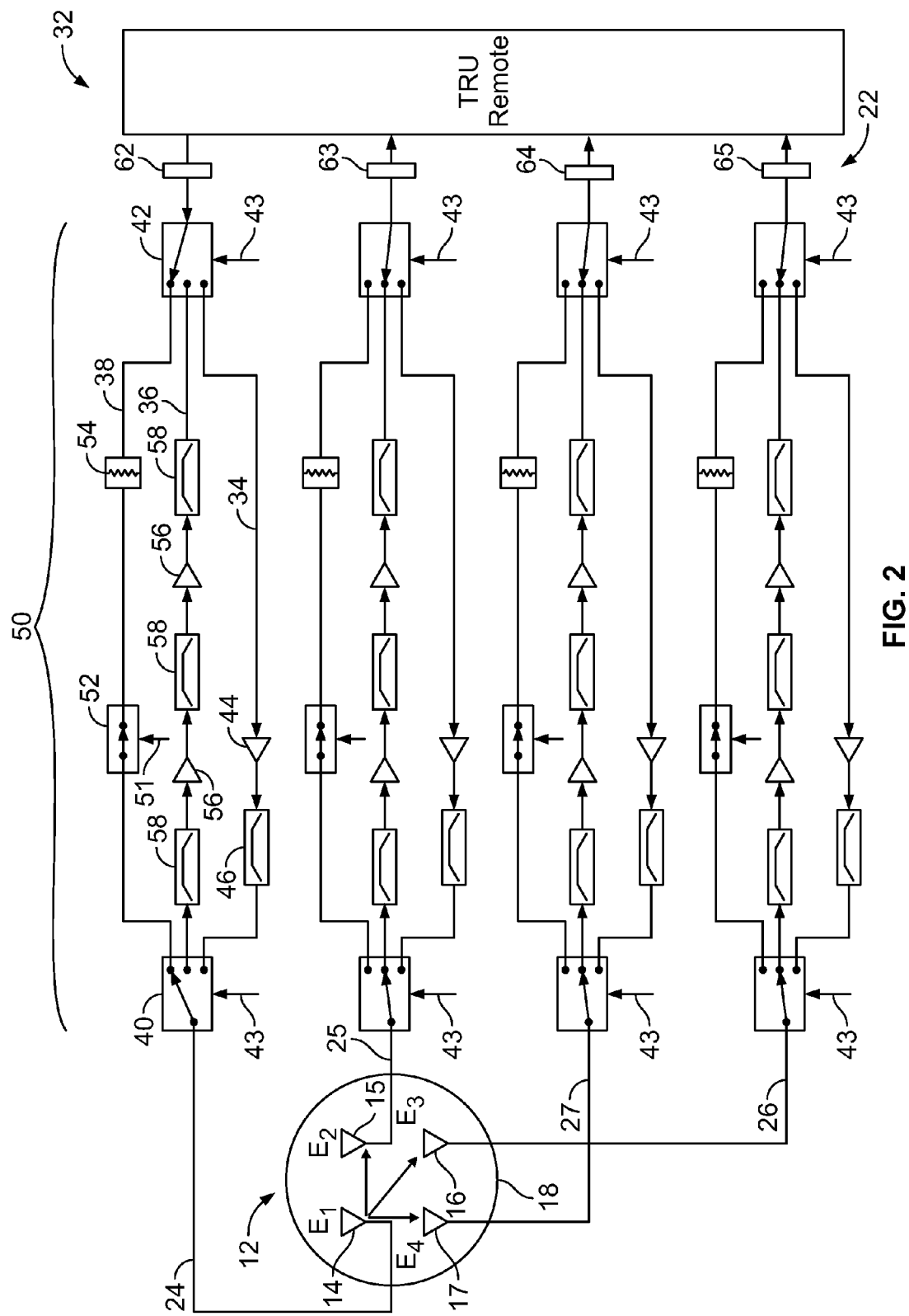
FIG. 2 illustrates a detailed block diagram of a PCB module of an active antenna formed in accordance with an embodiment of the present invention.

FIG. 2 illustrates a more detailed block diagram of the signal paths and components within an exemplary implementation of the antenna module 20. The antenna elements 14-17 are directly mounted to the antenna PCB 18. The active component PCB 50 may be provided within the interior surface of an aircraft, and adjacent to, the antenna PCB 18 which is provided upon the exterior surface of the aircraft. The active component and antenna PCBs 50 and 18 may be coupled to one another directly through contacts extending through the exterior of the aircraft.

The channels 24-27 extend through the active component PCB 50. The following discussion of the structure of FIG. 2 shall refer to one channel (e.g., channel 24), although it is understood that each channel 24-27 preferably includes similar structure. Specifically, each channel 24-27 preferably includes a transmit path 34, a receive path 36, and a calibration or bypass path 38. The transmit, receive and calibration paths 34-38 extend between switches 40 and 42 that are connected to the corresponding antenna elements 14-17 and corresponding connector elements 62-65 within the connector module 22. The active component PCB 50 may include individual traces associated with each transmit, receive and calibration path 34, 36, 38. In addition, the active component PCB 50 may include various electrical components provided upon or embedded within the circuit traces, such as the power amplifiers 44, the low noise amplifiers 56, and various bandpass filters 46. The term "transmit channel" shall refer to a path from the T/R unit 32 over a corresponding transmission link 28-31 and transmit path 34 of the antenna module 20 to an antenna element 14-17. The term "receive channel" shall refer to a path from an antenna element 14-17 over a corresponding receive path 36 of the antenna module 20 and transmission link 28-31 to the T/R unit 32. The term "calibration channel" shall refer to a path to/from the T/R unit 32 over a corresponding transmission link 28-31 and calibration path 38 of the antenna module 20 to/from an antenna element 14-17. The switches 40 and 42 are controlled by control signals 43 to selectively choose one of transmit, receive and calibration paths 34, 36, 38 based on a particular operation to be carried out by the T/R unit 32. The control signals 43 are separately provided for each of the channels 24-27 from the T/R unit 32 to provide individual control over a state or position of each switch 40 and 42.

The transmit path 34 includes a high power amplifier 44 in series with a bandpass filter 46. The power amplifier 44 is provided within the antenna module 20 and located along the transmit path 24 in order to increase the power level of the electrical transmit signals from a low power level received from the transmission line 28. The power amplifier 44 increases the power level of the electrical transmit signals by an amount sufficient to drive the corresponding antenna elements 14 to transmit RF transmit signals at a predetermined effective radiating power (ERP). The bandpass filter 46 removes undesirable high and low frequency components from the high power output of the power amplifier 44, before the electrical transmit signals are passed through the switch 40 to the antenna element 14.

The connector module 22 receives, from the transmission line 28, electrical transmit signals at a low power level that is less than a predetermined ERP at which RF transmit signals are to be transmitted from the corresponding antenna elements 14. By way of example only, the connector module 22 may receive, from the transmission line 28, electrical transmit signals at a low power level, such as between 1 and 10 W. More preferably, the electrical transmit signals conveyed over the transmission line 28 may be between 4 and 8 W and in certain applications at approximately 6 W.

The receive path 36 includes low noise amplifiers 56 and bandpass filters 58 joined in series to process received electrical signals before transmission over the transmission lines 28-31. The low noise amplifiers 56 of FIG. 2 correspond to the low noise amplifiers 45 of FIG. 1. The receive path 36 extends between the antenna element 17 and the connector module 22 in order to convey RF receive signals there along.

The calibration path 38 includes an isolation switch 52 provided in series with an attenuation element 54. The isolation switch 52 is opened and closed by an isolation control signal 51. The isolation control signal 51 opens the isolation switch 52 when switches 40 and 42 connect to the receive path 36 or the transmit path 34 in order to provide electrical isolation for the receive path 36 and transmit path 34. The calibration path 38 is utilized in connection with both transmit and receive calibration operations for the antenna array 12. The calibration path 38 provides a bypass around the low noise amplifiers LNAs 56 and filters 58 in the receive path 36, during a transmit calibration operation, and provides a bypass around the power amplifiers 44 and filters 46 in the transmit path 34, during a receive calibration operation. During a calibration process, the RF receive signals produced at the antenna elements 14-17 may be at a receive power level that is higher than a power level at which the transmit/receive unit 32 is configured to operate. The attenuation element 54 in the calibration path 38 reduces the power level of the electrical receive signal used to characterize each of the transmit channels to within an accepted range to be conveyed to the transmit/receive unit 32. The calibration path 38, receive path 36 and transmit path 34 in each channel 24-27 are co-located on the active component PCB 50 at the antenna module 20. To determine the transmit phase offsets, the calibration path 38 provides phase information at the input to the receive units 70-73 in the T/R unit 32. To determine the receive phase offsets, the calibration path 38 provides a path for the 1090 MHz signal from the transmit units 80-83 in the T/R unit 32. The calibration path 38 also allows direct access to each antenna element 14-17 by the T/R unit 32, by means of appropriate switching, to support additional use of the antenna elements 14-17 for additional L-band equipment usage such as Transponder, DME, or Universal Access Transceiver (UAT).

Figure 3:
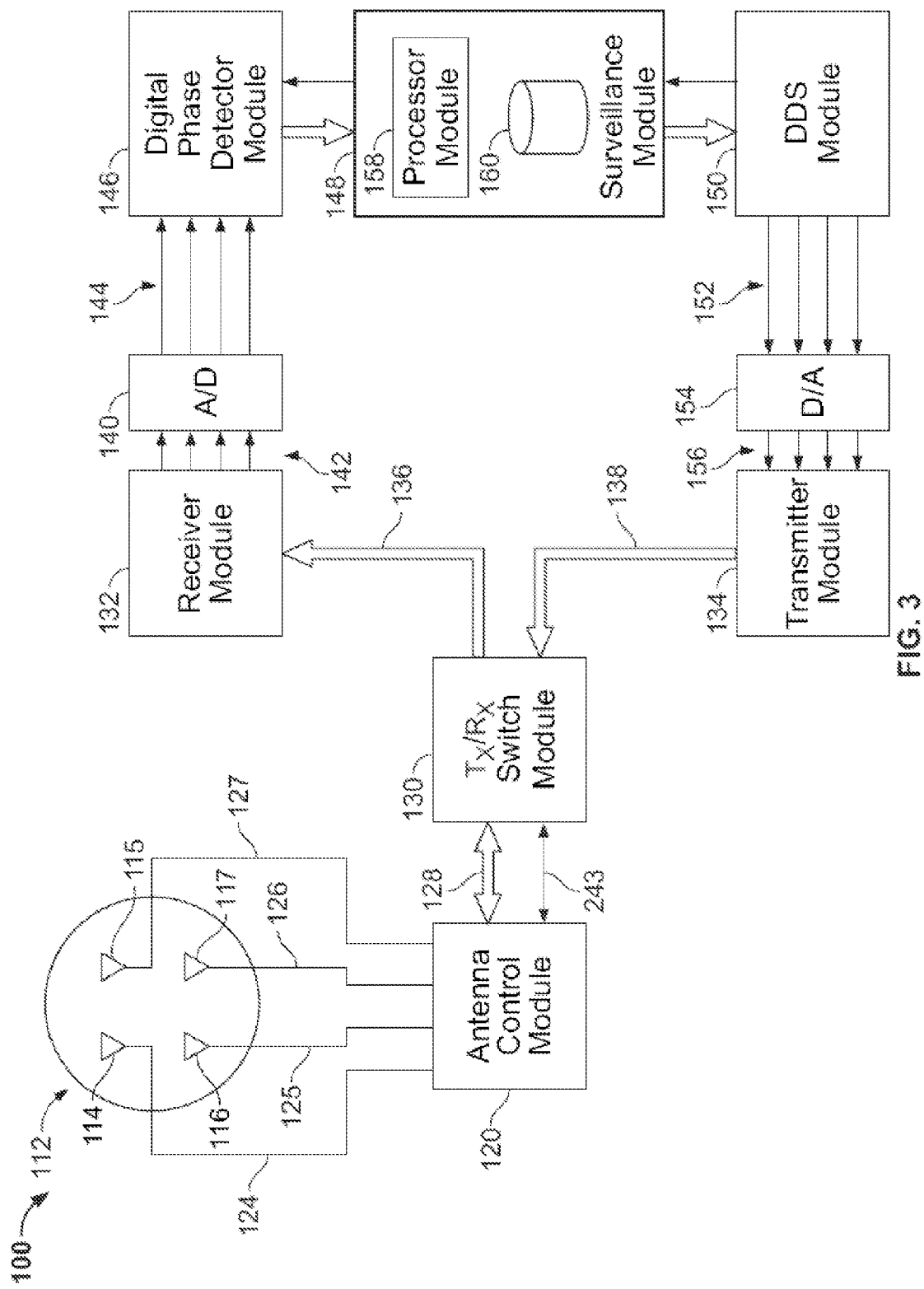
FIG. 3 illustrates a block diagram of a surveillance system utilizing an active antenna formed in accordance with an embodiment of the present invention.

FIG. 3 illustrates a block diagram of a surveillance system 100 formed to implement an active antenna in accordance with an embodiment. The system 100 includes an active antenna array 112 comprised of antenna elements 114-117 and antenna control module 120. The antenna control module 120 communicates over multiple coaxial transmission lines (generally denoted at 128) with a transmit/receive switch module 130 which selectively joins the transmission lines 128 with one of a receiver module 132 and transmitter module 134 over transmit and receive lines 136 and 138, respectively. The receive and transmit lines 136 and 138 each include multiple coaxial lines that convey analog signals to and from the transmit/receive switch module 130. During a receive operation, the transmit/receive switch module 130 joins the receiver module 132 over a number of receive lines 136 to an equal number of transmission lines 128. During a transmit operation, the transmit/receive switch module 130 joins the transmitter module 134 over a number of transmit lines 138 to an equal number of transmission lines 128. The transmit/receive switch module 130 changes the antenna control module 120 between transmit and receive states with a control line 243. Control line 243 may include one or more individual lines to provide the T/R signals 43 (FIG. 2) and the isolation control signals 51.

The receiver module 132 is joined to an analog to digital (A/D) converter 140 via analog lines 142. The A/D converter 140 is joined over a series of digital channels 144 to a digital phase detector processing module 146. The digital phase detector/processor module 146 communicates with a surveillance module 148. The surveillance module 148 is also joined to a DDS module 150 that outputs, over a number of digital channels 152, signals to be transmitted by the antenna array 112. The digital channels 152 are provided to a D/A converter 154 that converts the digital signals to analog signals and outputs the analog signals over a number of analog lines 156 to the transmitter module 134. The surveillance module 148 includes a processor module 158 and memory 160 that are utilized, among other things, to coordinate the transmit and receive operations.

Figure 4:
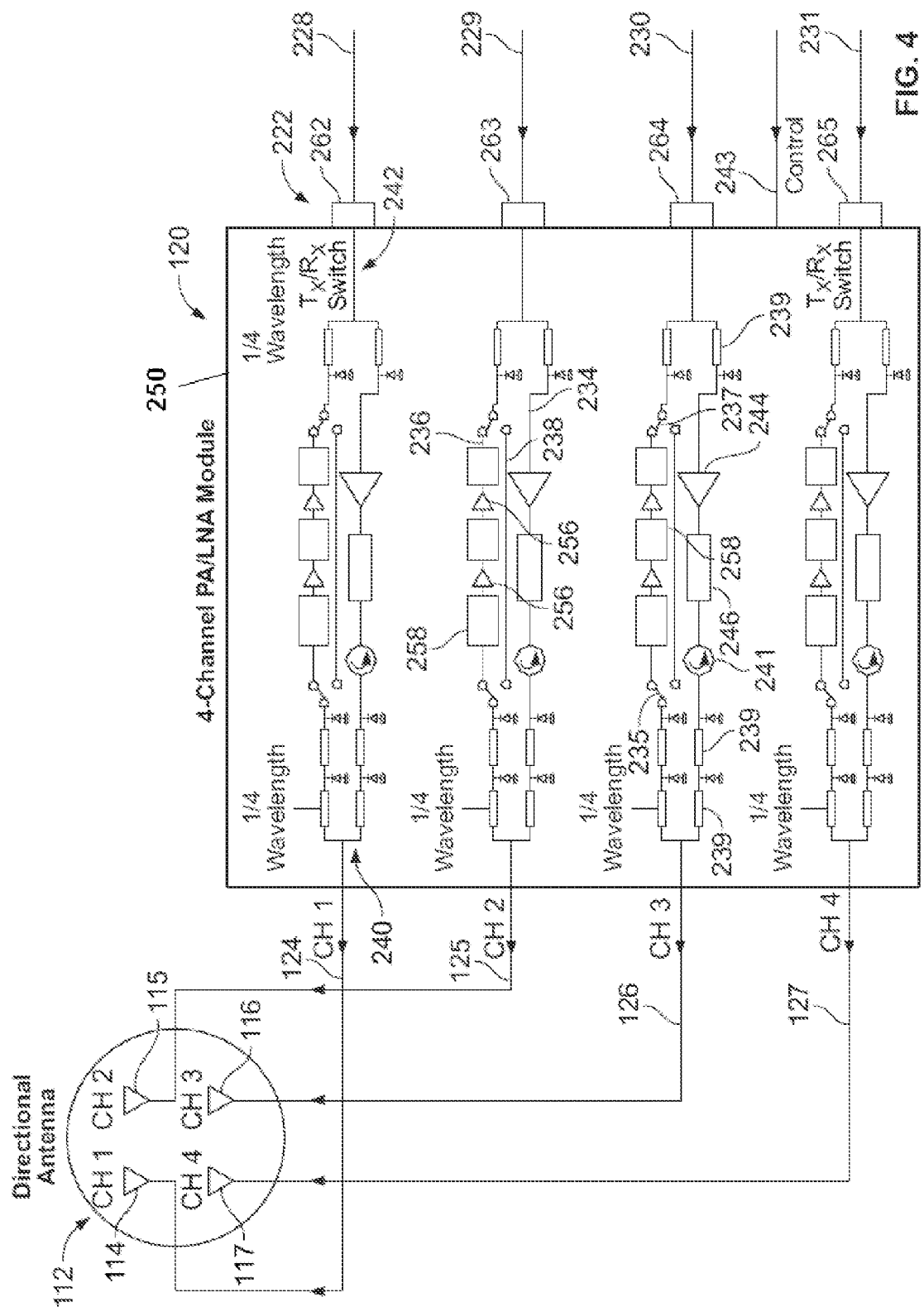
FIG. 4 illustrates a detailed block diagram of the antenna control module of FIG. 3.

FIG. 4 illustrates a more detailed block diagram of the signal paths and components within antenna control module 120. The antenna control module 120 includes an active component PCB 250 on which the channels 124-127 are provided. Each channel 124-127 includes a transmit path 234, a receive path 236, and a calibration path 238. The transmit, receive and calibration paths 234-238 extend between switches 240 and 242 that are connected to the corresponding antenna elements 114-117 and corresponding connector elements 262-265 within connector module 222. The switches 240 and 242 are controlled by T/R signals that are conveyed over control line 243 from the transmit/receive switch module 130. The control line 243 selectively chooses one of the transmit, receive and calibration paths 234-238 based on a particular operation to be carried out by the transmit/receive switch module 130.

The transmit path 234 includes a high power amplifier 244 in series with a bandpass filter 246, an isolator module 241, and an RF switch 239. The power amplifiers 244 increase the power level of the electrical transmit signals from a low power level received from the transmission lines 228-231. The power amplifiers 244 increase the power level of the electrical transmit signals by an amount sufficient to drive the corresponding antenna elements 114-117 to transmit RF transmit signals at a predetermined effective radiating power (ERP). The bandpass filters 246 remove undesirable high and low frequency components from the high power output of the power amplifier 244, before the electrical transmit signals are passed through the switches 240. The isolator modules 241 present a controlled impedance to each RF transmit channel. A number of ¼ wavelength lines constitute the RF switch 239 to control signals between transmit path 234, receive path 236, or the calibration path 238.

The receive paths 236 includes low noise amplifiers 256 and bandpass filters 258 joined in series to process received electrical signals before transmission over the transmission lines 228-231. The receive paths 236 extend between the antenna elements 114-117 and the connector module 222 in order to convey RF receive signals there along. The RF receive signals are produced by the antenna elements 114-117 at a low receive power, amplified by the low noise amplifiers and conveyed down transmission lines 228-231. This operation improves the noise figure and thereby useable receiver sensitivity and receiver range by avoiding the contribution to noise figure degradation introduced by the inherent loss in transmission lines 228-231.

The calibration paths 238 are formed as bare traces, with an attenuation element 54 (FIG. 2), and terminate at switches 237 and 235. The switches 237 and 235 are controlled by the control line 243 to switch between the calibration and receive paths 238 and 236. The calibration path 238, receive path 236 and transmit path 234 in each channel 124-127 are co-located on the active component PCB 250 at the antenna module 120, thereby affording an easy bypass route along the calibration path 238 to provide a known phase condition at the input to the transmit/switch module 130.

Certain embodiments of the present invention recognize the problems inherent in passive antenna arrays and address these problems by providing a TAS transmitter, a TCAS transmitter, and/or a Universal Access transmitter that uses low cost components, minimizes internal losses, reduces power supply requirements, and provides a cleaner spectral signature without the need for expensive ceramic filtering.

According to one embodiment, a distributed power architecture is provided where the final power amplifier assembly is located at the transmitting antenna elements and all low level stages are located within the remote transmitter/receiver unit. According to another embodiment, a plurality of modulated radio frequency final amplifiers are co-located at the antenna in a system referred to as an active phased antenna array. By co-locating the driven power amplifier elements at the antenna, the system eliminates RF power loss of switching and transmission lines encountered by conventional passive antenna arrays. This allows much smaller final power amplifier devices to meet the requirements of the Minimum Operating Performance Specifications (MOPS as defined in both DO197A and DO185A), thereby increasing efficiency and allowing the design to be more reliable, reduce the cost and complexity and increase the reliability of the transmitter. Each final power amplifier in the active phase array may be controlled by a custom bias controller to provide accurate temperature bias compensation and fault monitoring, controlled by the digital signal processor of the transmit/receive unit. The custom bias controller provides soft ramp-up of the bias thereby maintaining the integrity of lateral diffused metal oxide semiconductor (LDMOS) power devices.

Another aspect of the above-described embodiments of an active antenna may allow intelligent control of $V_{GS}$ drift or a change in bias point due to hot-carrier injection. The controller is able to sense and compensate for the effects of drift and changes in the bias point. Fault analysis may be provided to the main processing unit to allow fail soft control of each of the plurality of channels. By compensating for an individual channel failure continued operation can be accommodated at a reduced power level. Since each channel is under digital control, compensation can be made to assure the directionality of the transmit pattern is not compromised.

TAS, TCAS I, and TCAS II all provide power control in discrete steps to limit the amount of radiated power used to interrogate other aircraft in a process termed Whisper-Shout. Power control is provided by the digital signal processor function embodied in the FPGA (field programmable gate array) of the main processor unit. By direct digital synthesis (DDS) this signal provides the drive levels necessary to the active antenna array's power amplifier section to achieve the output power level desired.

Another aspect of the above embodiments is the capability of direct digital synthesis to provide the pulse shaping, pulse timing, pulse amplitude modulation and binary phase shift keying (BPSK) modulation to meet system requirements. According to yet another embodiment, the means is provided to adjust the relative transmit phase of the four channels to facilitate beam forming of the antenna transmission pattern. In an embodiment, the beam forming is performed by direct digital synthesis. The DDS provides the calibrated phase to each channel, corrected by an autonomous calibration process, by using a cosine look-up table. These signals provided at an intermediate frequency (IF) are up converted to the transmit channel. Once upconverted, these signals are filtered and amplified by the low level stages and provided to the phased antenna array for final amplification.

According to yet another embodiment, the phased antenna array also contains the low noise amplifiers (LNA) for the receiver section which allows for a much lower noise figure for the system. By co-locating the LNA's with the antenna the noise figure contribution of the transmission cables can be effectively eliminated. This can be as much as 3 decibels (dB) which is a substantial portion of the receiver's noise budget. By decreasing the noise figure of the receiver design the above embodiments can effectively increase the passive surveillance range of the system to 150 to 200 nautical miles. According to yet another embodiment, the bottom antenna design can use a single driven active element with integral LNA for bottom omni-directional transmissions for TAS or TCAS I and UAT signaling. This allows for a cheaper implementation by parts reduction of the dual antenna system to provide optional coverage for the bottom of the aircraft. All low level drive signals for the transmitter final are provided as for the active phased antenna array but in this case consists of only a single channel that does not need phase control except for the BPSK modulation. The final amplification for the transmit signal is provided at the antenna.

While the invention has been described in terms of various specific embodiments, those skilled in the art will recognize that the invention can be practiced with modification within the spirit and scope of the claims.

What is claimed is:

1. A TAS/TCAS active antenna apparatus, comprising:
  an antenna element for transmitting TAS/TCAS interrogation signals at a predetermined effective radiated power (ERP) and for receiving TAS/TCAS interrogation response signals;
  an antenna module configured to be mounted to an aircraft, the antenna module being mounted adjacent to the antenna element and coupled to the antenna element and a communications link to receive the TAS/TCAS interrogation signals from the communications link, the antenna module including
    a receive path extending between the antenna element and the communications link, and
    a transmit path extending between the antenna element and the communications link, the transmit path being different than the receive path;
  a transmit power amplifier provided on the transmit path of the antenna module, the power amplifier increasing a power level of the TAS/TCAS interrogation signals received from the communications link by an amount sufficient to drive the antenna element to transmit the TAS/TCAS interrogation signals at the predetermined ERP; and a receive power amplifier provided on the receive path of the antenna module, the receive power amplifier for increasing a power level of the received TAS/TCAS interrogation response signals before outputting the received signals to the communications link, wherein the antenna module includes first and second circuit boards (CB), the first CB having the antenna element mounted thereon, the second CB having the power amplifiers mounted thereon.

2. The apparatus of claim 1, further comprising a phased array having a plurality of the antenna elements that transmit and receive radio frequency signals.

3. The apparatus of claim 1, wherein the antenna module receives the TAS/TCAS interrogation signals from the communications link at a power level of less than 10 watts and the antenna module provides the TAS/TCAS interrogation signals to the antenna element at a power level over 10 watts.

4. The apparatus of claim 1, wherein the antenna module includes first and second circuit boards configured to be mounted to the exterior and interior of an aircraft, respectively.

5. The apparatus of claim 1, further comprising a coaxial line forming at least a portion of the communications link and conveying the TAS/TCAS interrogation signals to the antenna module at a power level of less than 10 watts.

6. The apparatus of claim 1, wherein the antenna module includes a calibration path extending between the antenna element and the communications link, the calibration path including an attenuation element for reducing a power level of a received TAS/TCAS interrogation response signal before outputting the received signal to the communications link.

7. The apparatus of claim 1, wherein the antenna module includes a calibration path, wherein the paths extend parallel to each other between the antenna element and the communications link.

8. The apparatus of claim 1, further comprising a remote transmit unit coupled to the communications link, the remote transmit unit outputting the TAS/TCAS interrogation signals over the communications link to the antenna module at a power level of less than 10 watts.

9. A TAS/TCAS active antenna apparatus, comprising:

an antenna element mounted to an external surface of an aircraft for transmitting TAS/TCAS interrogation signals and receiving TAS/TCAS interrogation response signals;

an antenna module coupled to the antenna element and comprising a transmit path having a transmit amplifier amplifying the TAS/TCAS interrogation signals to a first power level from a second power level, and a receive path, parallel to the transmit path, and having a receive amplifier amplifying the TAS/TCAS interrogation response signals to a third power level from a fourth power level;

a bidirectional coaxial line coupled to the antenna module; and a transmit and receive unit, mounted remotely from the antenna module and coupled to the coaxial line, generating the TAS/TCAS interrogation signals over the coaxial line at the second power level and receiving the TAS/TCAS interrogation response signals over the coaxial line at the third power level, wherein the antenna module includes first and second circuit boards (CB), the first CB having the antenna element mounted thereon, the second CB having the transmit and receive amplifiers mounted thereon.

10. The apparatus of claim 9, wherein the antenna element receives the TAS/TCAS interrogation signals from the antenna module at the first power level, the first power level being greater than the second power level which is received by the antenna module from the transmit and receive unit.

11. The apparatus of claim 9, wherein the transmit and receive unit receives the TAS/TCAS interrogation response signals from the antenna module at the third power level, the third power level being greater than the fourth power level which is received by the antenna module from the antenna element.

12. The apparatus of claim 9, wherein the antenna module further includes a calibration path parallel to both the transmit path and the receive path, the calibration path having an attenuator attenuating calibration signals from a fifth power level to a sixth power level.

13. The apparatus of claim 9, the antenna module further including selector switches located at either end of the paths for selecting between the paths.

14. The apparatus of claim 9, wherein the coaxial line carries the TAS/TCAS interrogation signal from the transmit and receive unit toward the antenna element at a lower power level than that used by the antenna element.

15. The apparatus of claim 9, wherein the coaxial line carries the TAS/TCAS interrogation response signal to the transmit and receive unit from the antenna element at a higher power level than that received at the antenna element.

16. The apparatus of claim 9, wherein the first power level is greater than 40 watts and the second power level is less than 10 watts.

17. The apparatus of claim 9, wherein the third power level is greater than 4 watts and the fourth power level is less than 4 watts.

18. The apparatus of claim 12, wherein the fifth power level is greater than 10 watts and the sixth power level is less than 10 watts.

* * * * *